Oct. 26, 1965 L. W. COOK 3,213,987
CLUTCH MECHANISM
Filed May 16, 1962 2 Sheets-Sheet 2
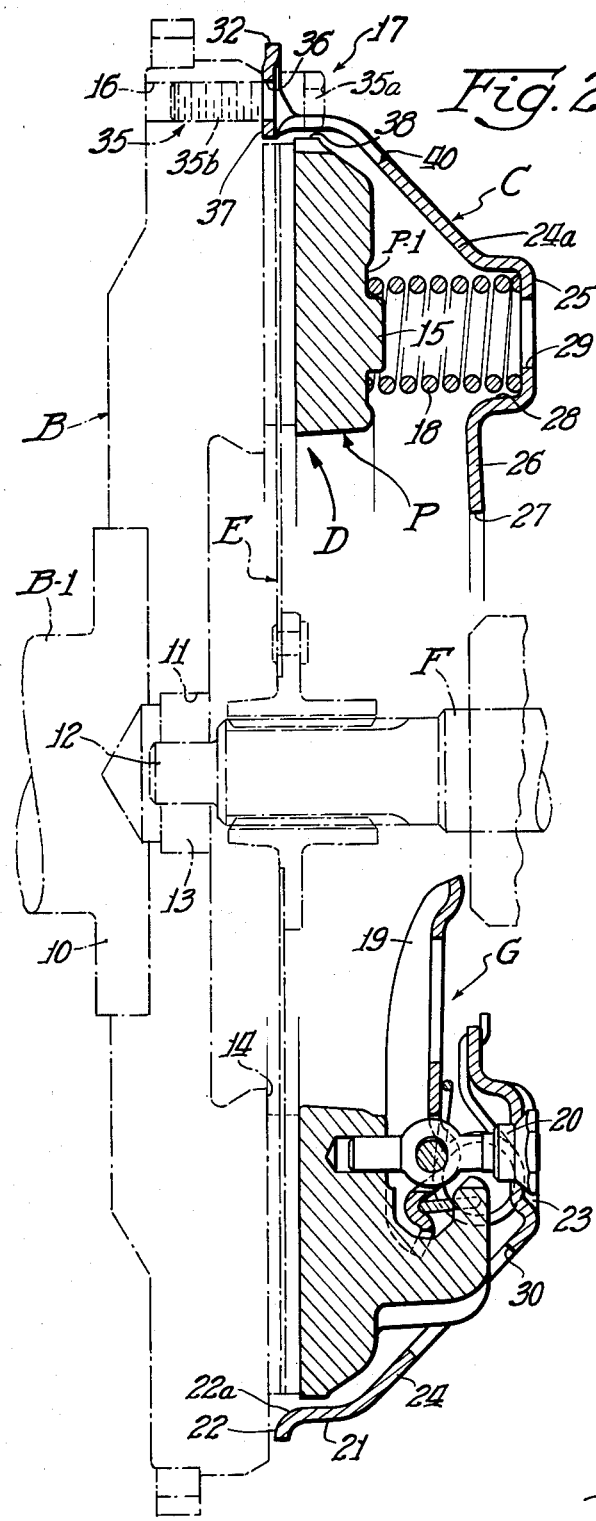
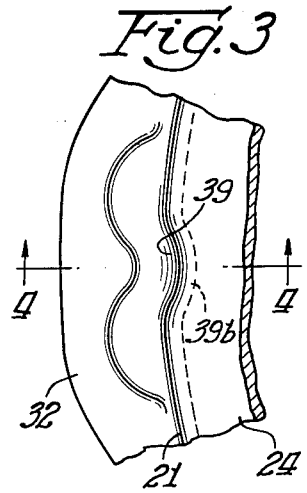
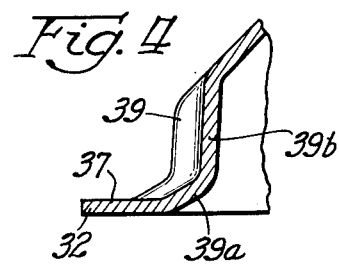
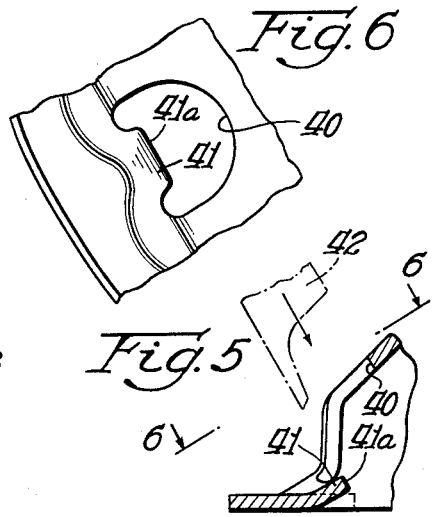
Inventor:
Leo W. Cook
By: Joseph W. Malleck atty.

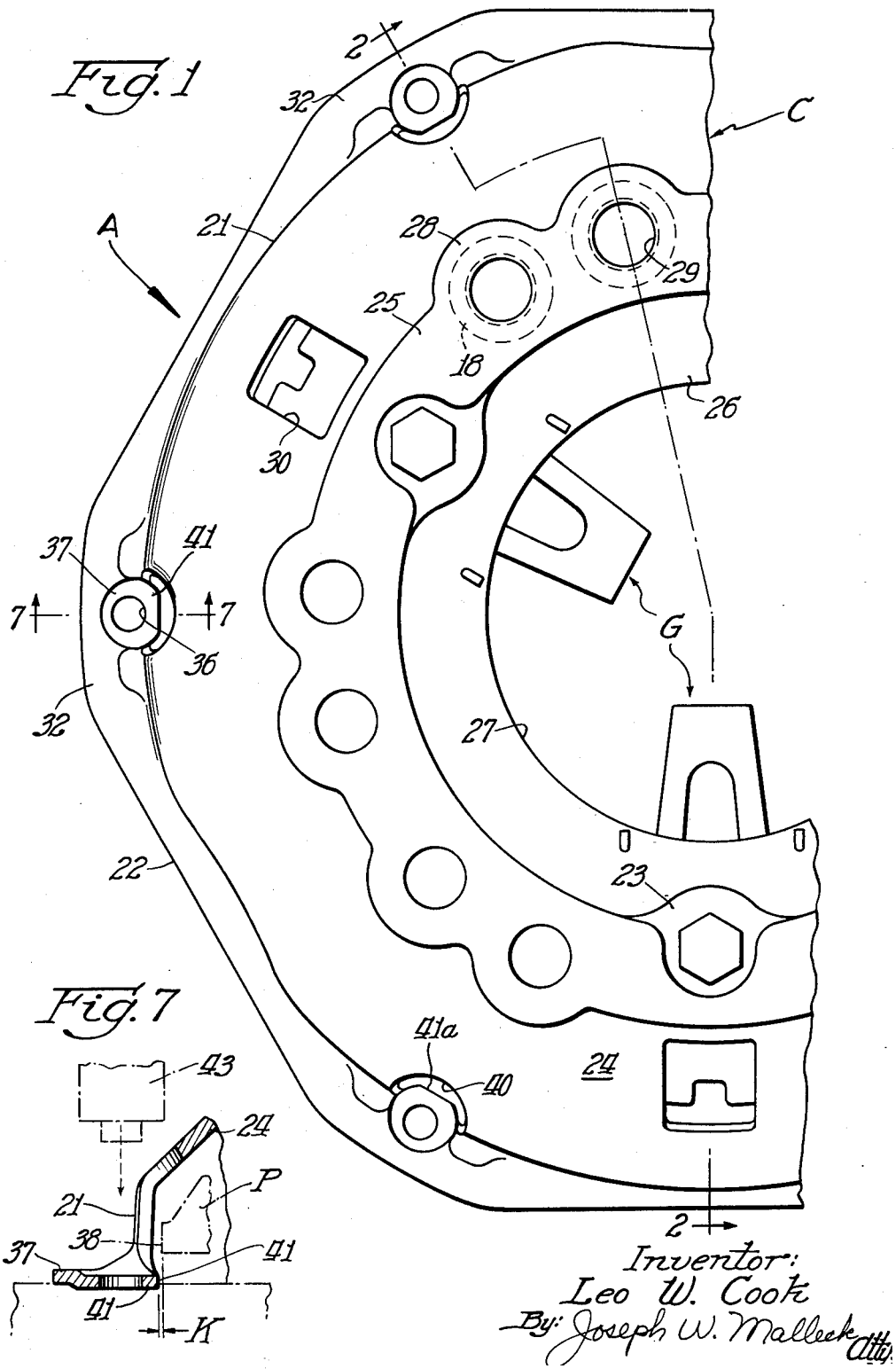

United States Patent Office 3,213,987
Patented Oct. 26, 1965

3,213,987
CLUTCH MECHANISM
Leo W. Cook, Chicago, Ill., assignor to Borg-Warner Corporation, Chicago, Ill., a corporation of Illinois
Filed May 16, 1962, Ser. No. 195,265
2 Claims. (Cl. 192—68)

This invention relates to clutch devices of the friction disc type and more particularly to the structure, assembly, and method of making mounting means forming a part of a clutch cover plate.

One function performed by the clutch cover plate in a clutch device of the friction disc type is the transmission of rotative drive from a flywheel or input shaft to a gradually engageable clutch means by way of a variety of mediums, such as springs, levers, etc. Cover plates are typically cup-shaped, having a cylindrical wall portion with lips extending radially outwardly therefrom and which lips are adapted to be fastened to the flywheel. One of the most successful means for fastening or joining the cover plate lips to the flywheel is a plurality of circumferentially spaced cap screws or bolts extending through portions thereof.

One long-standing desire concerned with such construction is that of maintaining the locations at which the cap screws extend through the lips of the cover plate as close as possible to the outer periphery of the clutch means enclosed by the cover plate. This has the advantage of providing a more compact clutch device, strengthening the cover plate against flexing during operation of the clutch, and providing a more economical, durable construction.

Prior attempts of the art to adapt the cover plate in accordance with the above desire have utilized means for recessing inwardly the cylindrical portion of the cover plate and have resorted to various combinations of expensive machining operations and stamping operations to provide a mounting pad or segment for each of the cap screw heads which is located more radially inwardly. However, such methods and means have produced a mounting pad which is non-uniform in thickness. It is quite critical that the supporting segment formed for the bolt or screw be uniform and supported flushly on opposite sides so that it may provide a stable support for the fasteners; the clutch cover plate will then be less susceptible to failure.

A primary object of this invention is to provide an improved clutch cover plate construction and an improved method for manufacturing said cover plate.

Another object of this invention is to provide a clutch cover plate for a clutch of the friction disc type comprising means adapted for receiving fastening means adjoined to the clutch device, said means including pads stationed partially radially inwardly of the cover side wall and being of a uniform thickness adapted to meet with the fastening means and flywheel in unprecedented flush relation.

Another object of this invention is to provide a clutch cover plate which is particularly manufactured so that a circle inscribing the centers of the cover plate fastening means is considerably smaller than a circle inscribing the centers of fastening means of prior art cover plates for a given size clutch device.

Yet another object of this invention is to provide a clutch cover plate having supporting segments particularly constructed so that the portions of the cover plate enclosing a pressure plate of the clutch means is adapted to reduce the gap existing therebetween compared to that in prior art devices; said segments also permit said gap to be regulated to a desired dimension and which is less than that permitted by prior art devices.

Yet still another object of this invention is to provide a clutch cover plate construction and method for producing the same which is adapted to strengthen the cover plate, reduce susceptibility to failure, and enable the clutch device to be more compactly constructed.

A detail object of this invention is to provide a clutch cover plate according to a novel method comprising: forming the cover plate of a generally cup-shaped configuration having a cylindrical side wall terminating in an open end, the side wall having at least one flat lip extending radially outwardly from the margin of the open end and lying in the plane of the open end; drawing a portion of said side wall adjacent said lip radially inwardly thereof in a manner to provide a generally semi-circular recessed area; shearing said drawn portion except for a tongue-shaped part extending from a location adjacent said lip; and stamping said tongue-shaped part in a direction to move the part into the plane of said lip and disposed radially inwardly of said cover plate side wall whereby said tongue-shaped part and lip are each of a uniform thickness throughout their extent and are adapted to provide a mounting means for the cover plate.

Other objects and features of the invention will be readily apparent to those skilled in the art from the specification and appended drawings illustrating certain preferred embodiments in which:

FIGURE 1 is a fragmentary elevational view of a clutch device embodying the principles of this invention;

FIGURE 2 is a sectional view taken substantially along line 2—2 of FIGURE 1 and illustrating in broken outline a complete clutch assembly;

FIGURE 3 is a fragmentary elevational view of a portion of the cover plate illustrating one stage of manufacture thereof;

FIGURE 4 is a fragmentary sectional view taken substantially along line 4—4 of FIGURE 3;

FIGURE 5 is a fragmentary sectional view like that of FIGURE 4, illustrating still another step in the manufacture of the cover plate;

FIGURE 6 is a view taken along line 6—6 of FIGURE 5; and

FIGURE 7 is a fragmentary sectional view taken substantially along line 7—7 of FIGURE 1.

Referring now to the drawings, and more particularly to FIGURES 1 and 2, there is illustrated a preferred embodiment of the present invention comprising a clutch device of the friction disc type, generally indicated A. In the broad aspects, the clutch device comprises a rotatable flywheel B to which is fastened a cover plate C; the flywheel and cover plate define a chamber within which is disposed a clutch means D including a pressure plate P and a driven disc E splined to an output shaft F. An operating assembly G is illustrated for showing means used to operate the pressure plate.

Referring now in more particularity to the parts of the clutch device, the flywheel B is annular in configuration and drivingly connected to an input shaft B-1; the flywheel has a central hub portion 10 provided with a bore 11 adapted to journal one end 12 of the output shaft by means of a bearing 13 received in the bore 11. The flywheel is of the flat-faced type and has an annular flat surface or means 14 adapted for engaging the driven disc on one side as brought thereagainst by actuation of the pressure plate. The flywheel has a plurality of circumferentially spaced threaded bores 16 adapted to receive fastening means 17 which will hereinatfer be described in more detail.

The operating mechanism G for the pressure plate P is comprised first of a plurality of circumferentially spaced clutch-engaging compression springs 18, each being adapted to act between one side P-1 of the pressure plate as journaled by one of a plurality of bosses 15 and a portion of the cover plate C. Selective disengagement of the clutch device is provided by a plurality of levers 19 journaled on I-bolt support means 20 on the cover plate; the levers, when pivoted, are adapted to overcome the action of the springs 18 and thereby relieve the pressure plate from engagement with the driven disc E. The levers 19 and support means 20 form a second part of the operating mechanism G.

Turning now in more particularity to the construction of the cover plate C, the plate is formed from sheet metal blanks stamped from strip stock and contoured largely by bending and folding operations into a generally cup-shaped member having a body comprised of a generally cylindrical wall portion 21 terminating in open end 22 and a rear wall 23. The rear wall 23 comprises a conically shaped section 24 terminating at its narrower end 24a with an annular channel section 25; the conical section 24 has openings 30 provided therein to accommodate portions of the pressure plate. The channel section 25 has formed therewith a radially inwardly extending annular flange 26; the flange 26 has a central opening 27 provided therein which is adapted to accommodate the operating mechanism G and to provide for ventilation of the clutch device. Formed at circumferentially spaced stations along the channel 26 are a plurality of circular seats or journals 28 which are adapted to journal one end of the springs 18 which bear against the cover plate. Central openings 29 are provided in the channel and are co-axial with the springs 18 and provide for ventilation therethrough.

The cylindrical wall portion 21 is integral with the larger end of the conical section 24 and has the opposite open end 22 defined by an annular edge. Extending outwardly from said edge are a plurality of circumferentially spaced lips 32 or mounting stations, each lip being interconnected by a radially outwardly extending chordally disposed flange 22.

The lips and cylindrical wall intersect and have a rounded or curved portion 22a (see FIGURE 2) therebetween which is formed by the bending operation in stamping the cover plate. The thicknes of the interconnecting portion 22a is uniform and is not drawn or thinned.

In order to fasten the cover plate to the flywheel, a plurality of bolts or cap screws 35 are utilized, comprising the fastening means 17, and are adapted to extend through openings 36 provided in the lips 32 and drivingly connected with the flywheel. Six circumferentially spaced cap screws are preferably used here. However, it is necessary to provide a flush pad or mounting segment 37 against which the head 35a of the cap screw may engage in a flush manner and which also must rest against the surface of the flywheel as clamped therebetween. It is most important that such mounting segment or pad 37 be uniform in thickness throughout, at least in the areas where the cap screw head is in contact therewith. If not, adequate support will be sacrificed and there will be a tendency for failure to occur at a much shorter life span. At the same time, it is also desirable to locate the cap screws and mounting pads as close as possible to the periphery 38 or outer diameter of the pressure plate to afford the advantages of compactness as well as durability and strength in the cover plate. Such relocation of the cap screws and mounting segments creates problems in the method of forming the cover plate.

Pursuant to these objectives, the novel method of fabrication is performed by the succeeding steps: A drawing operation is used to recess local areas or portions 39 of the cylindrical side wall radially inwardly therefrom. Such recessed areas are adapted to have a generally concave configuration and are curved opposite to the general contour of the side wall 21. The result of such drawing operation will produce a structure as shown in FIGURES 3 and 4. One important feature of the drawing operation is the biasing of the lower portion 39a of the recessed area. In other words, the biased lower portion 39a extends at an angle between the lips 32 and the upper recessed cylindrical side wall areas 39b. You will note that any sectional portion of the recessed upper portions 39b generally extend in an axial direction. This biasing of the lower portion is important to prepare the cover plate for subsequent operations so that the thickness or ply of the sheet metal constituting the pads 37 is not ruptured or distorted.

Next, a shearing operation is performed on the cover plate so that substantially the upper portion 39b of the recessed areas 39 are removed leaving a configuration or opening 40 as shown in FIGURES 5 and 6; such openings 40 constitute more than half of the area of the recessed areas 39. The remains of the recessed area 39 is that of a tongue-shaped portion 41 which constitutes a major part of the biased portion 39a. Such shearing operation may be performed by a tool 42 as shown in dotted outline in FIGURE 5. The tongue-shaped portion 41 resulting from the shearing operation is disposed at a gentle angle with relationship to the plane of the lips 32 and can easily be stamped or struck downwardly into such plane by means of a stamping tool 43 shown in broken outline in FIGURE 7. The stamping operation can also form the openings 36 through each lip 32 to receive the shank 35b of a cap screw 35.

A critical step in the method is the forming of the tongue-shaped portions 41 which become a part of the pad or mounting segment 32 for the cap screws, and which portions are moved from a gentle angle biased position; in direct contrast is the prior art which forms a pad for the screw heads by bending or stamping a portion of the cover plate side wall downwardly into the plane of the lips from the contoured position the portions possessed as a result of originally stamping the cover plate. Such original contour is extremely severe relative to the plane of the lips and permits wrinkling of the ply. In the present invention the upper part of edge 41a of the tongue-shaped portions 41 will not be crumpled or wrinkled during the stamping operation due to the rather gradual bias from which it is moved. Furthermore, the bottom part of edge 41a of the tongue-shaped portion is "square" and not roudned. In the prior art, in examples where the pad was not wrinkled at the top, it was subject to non-uniformity because the inner edge of the pad was formed from the curved intersection of the lips and side wall; thus, the bottom inner edge of the pads were subject to "loose play." In this invention, the full extent of the pad or mounting section is uniform in the thickness of the sheet metal and does not permit the cap screw to rock during high stress conditions.

Several advantages stem from the above method, among which are the following: heretofore expensive machining operations to remove a portion of the recessed area 39 are eliminated and may now be accomplished by a simple shearing operation; economical stamping operations are retained, but no longer result in a pad or mounting section 32 which is non-uniform throughout its extent; and the entire method permits the cap screws 35 to be stationed on an unprecedented smaller inscribed circle for a given clutch device. The cylindrical side wall 21, therefore, lies at a radial distance intermediate the circle inscribing the centers of the cap screws and the inner edges 41a of the mounting pad portions 41.

Of particular significance is the versatility and ability to precisely determine the amount of gap K that may exist between the outer diameter or periphery 38 of the pressure plate and the inner edge 41a of the tongue-shaped portions 41 forming part of the pads or mounting segments 32. According to prior art methods, the inner extent of the mounting pad was somewhat limited in placement due to a stamping operation which conformed the pads more closely to the side wall of the cover plate. Here, with the use of a biased, tongue-shaped portion 41 which can be bent downward from a gentle incline, the inner extent can be stationed more closely to the pressure plate and located at any degree radially inwardly of the cylindrical side wall 21.

While I have described my invention in connection with a certain specific construction and preferred method, it is to be understood that this is by way of illustration and not by way of limitation and the scope of my invention is defined solely by the appended claims which should be construed as broadly as the prior art will permit.

I claim:

1. A clutch device, comprising: input and output shafts; a flywheel drivingly connected to said input shaft and having a plurality of circumferentially spaced flat mounting means; means for clutching said output shaft with said flywheel and including a cover plate having a plurality of circumferentially spaced lips lying in a common plane and each adapted to mate with one of said mounting means on said flywheel, said cover plate having a cylindrical wall portion integral with said lips and extending rearwardly therefrom, each lip having at least one mounting segment with a tongue extending radially inwardly of said cylindrical wall portion, each of said mounting segments having a substantially uniform thickness throughout; and means extending through said mounting segments for fastening said cover plate with said flywheel and having head portions effective to fit flush against said mounting means.

2. A clutch device as in claim 1, in which said cover plate is comprised of sheet metal and the cylindrical wall portion thereof is integrally joined with each of said lips at a location lying between a circle inscribing the centers of said mounting segments and the radial innermost extremities of said tongues.

References Cited by the Examiner

UNITED STATES PATENTS

| | | | |
|---|---|---|---|
| 1,907,915 | 5/33 | Wemp | 192—68 |
| 1,937,070 | 11/33 | Ruesenberg | 192—68 |
| 2,240,346 | 4/41 | Nutt et al. | 192—68 |
| 2,417,035 | 3/47 | Zeidler | 192—68 |
| 2,485,648 | 10/49 | Norquist | 29—548 |
| 2,833,031 | 5/58 | Flumerfelt | 29—548 |
| 2,902,129 | 9/59 | Reed | 192—68 X |

DAVID J. WILLIAMOWSKY, *Primary Examiner.*

THOMAS J. HICKEY, *Examiner.*